Oct. 26, 1965
M. A. COYLE ETAL
3,214,092
VOTING MACHINES
Filed April 30, 1962
11 Sheets-Sheet 1
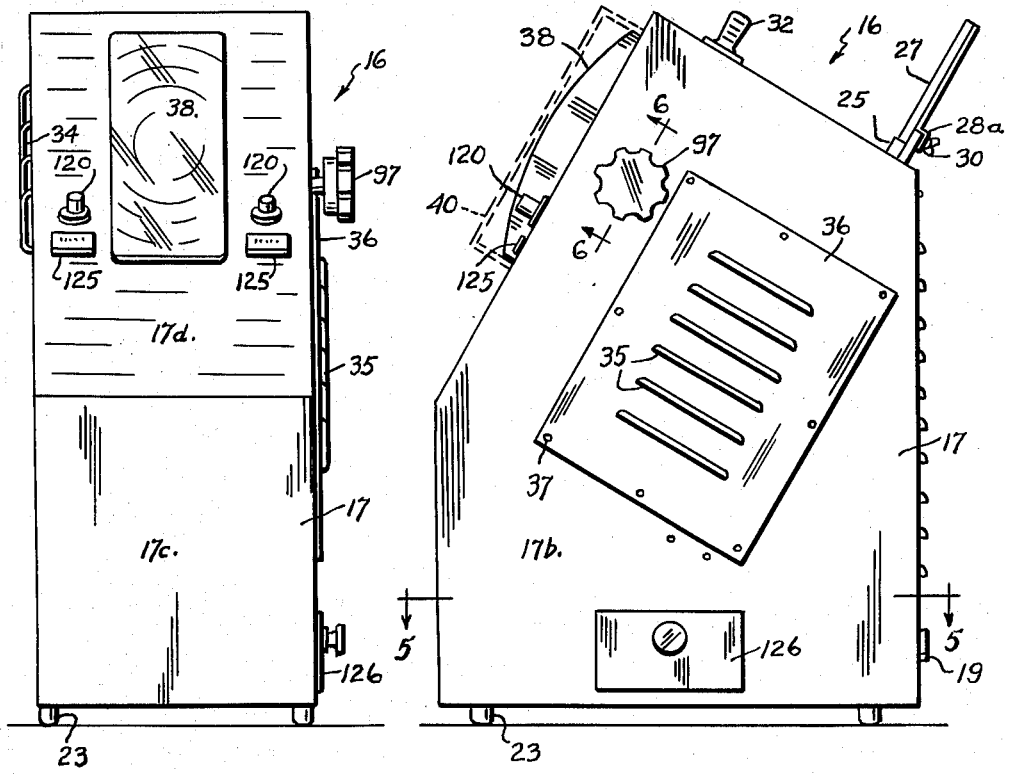
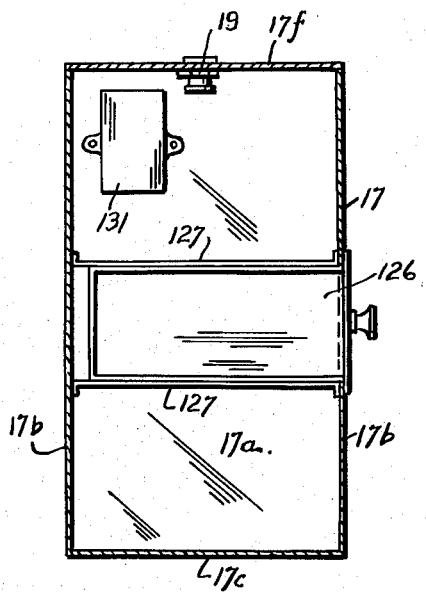
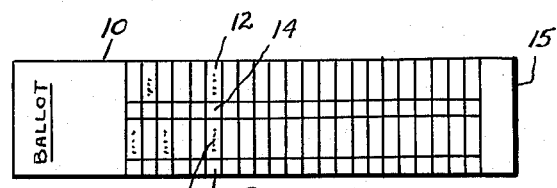
Inventors:
Martin A. Coyle
Theodore R. Dinsmore
By Munson Hare
Atty.

Oct. 26, 1965  M. A. COYLE ETAL  3,214,092
VOTING MACHINES
Filed April 30, 1962  11 Sheets-Sheet 2
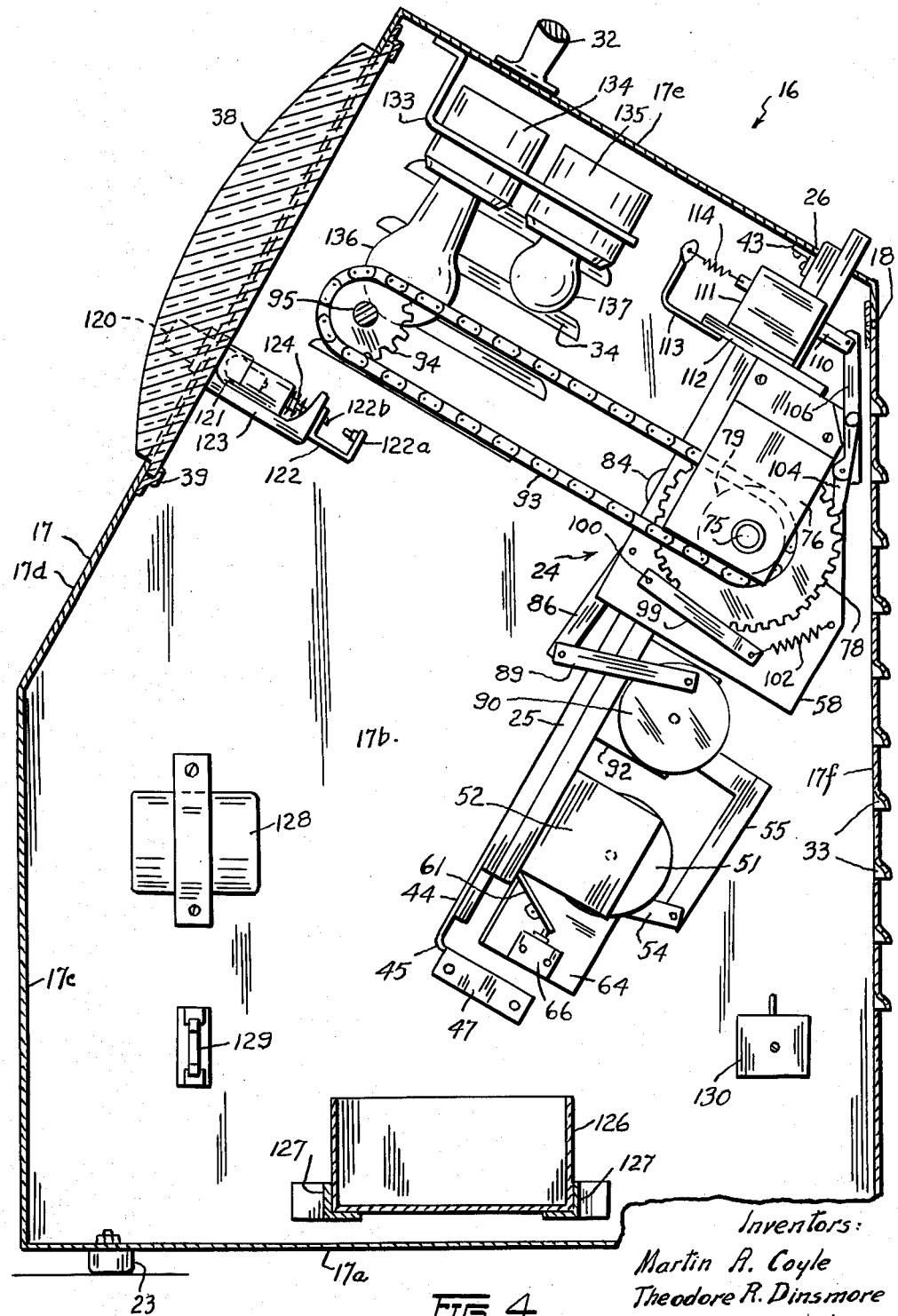
FIG-4-
Inventors:
Martin A. Coyle
Theodore R. Dinsmore
By
Atty.

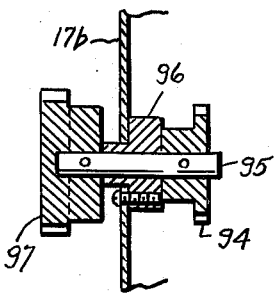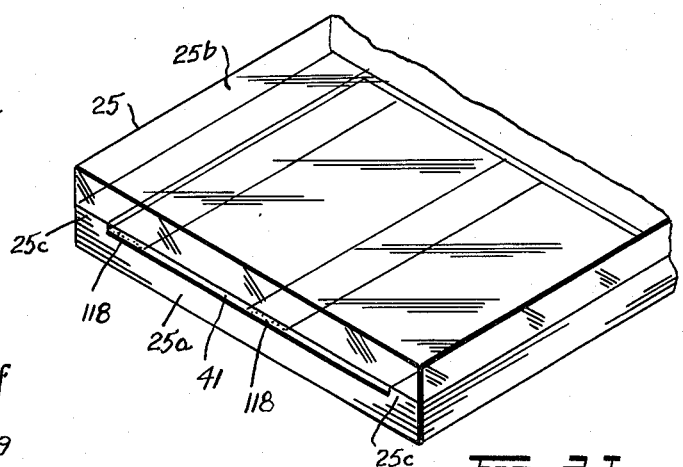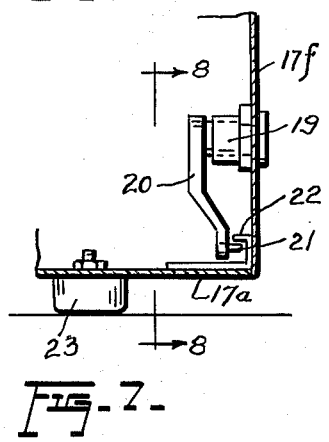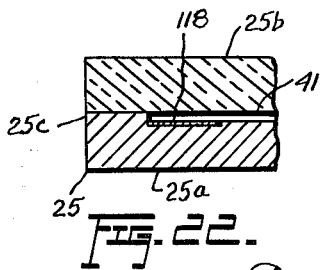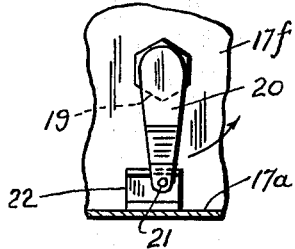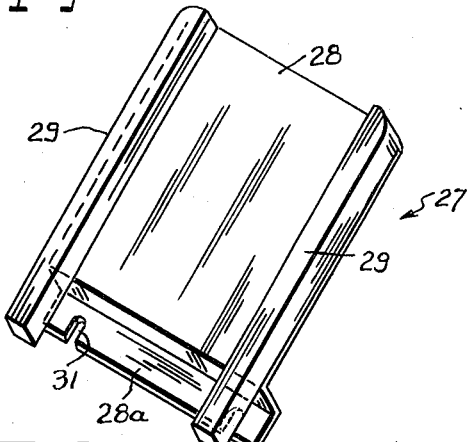

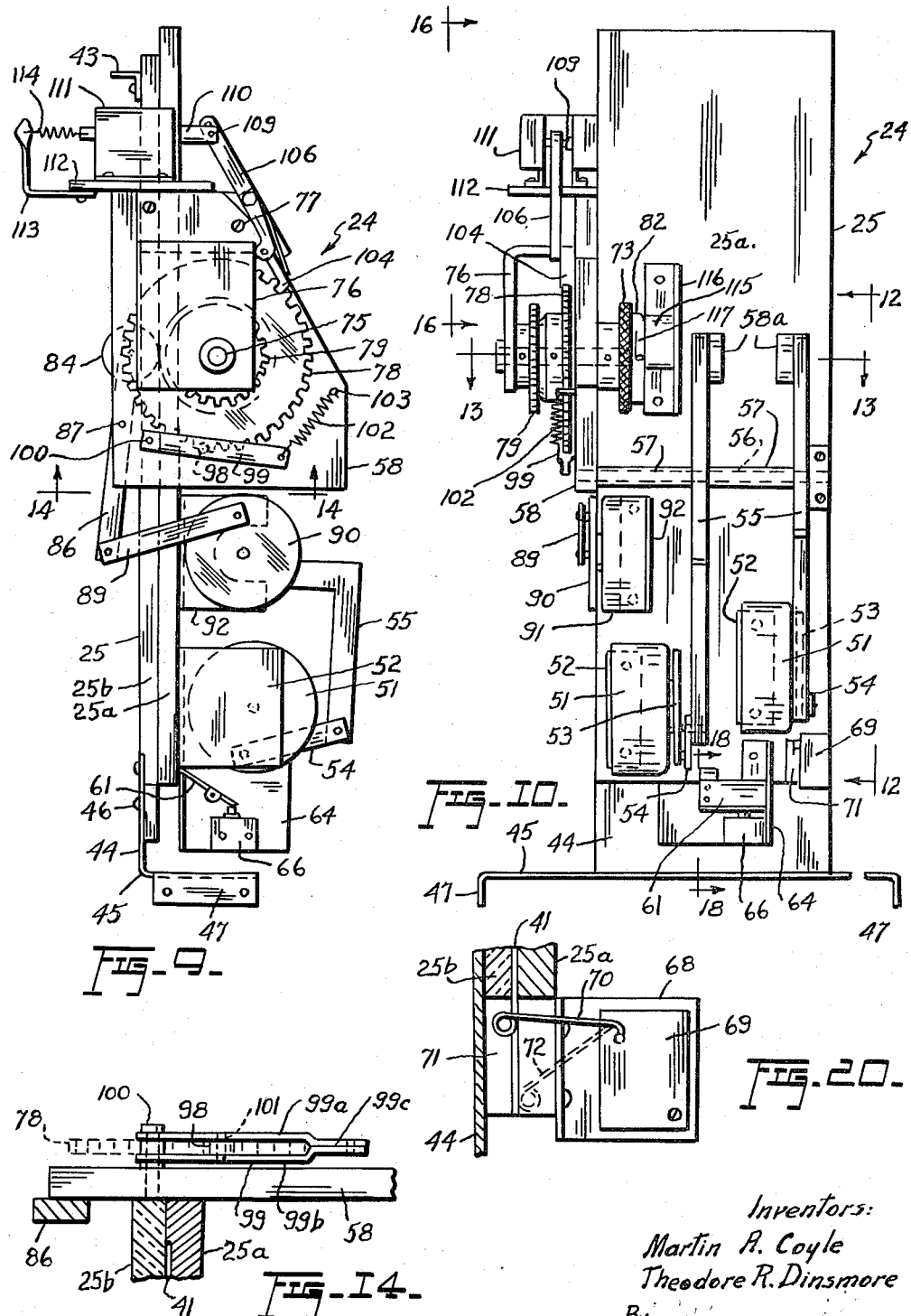

Oct. 26, 1965   M. A. COYLE ETAL   3,214,092
VOTING MACHINES
Filed April 30, 1962   11 Sheets-Sheet 5
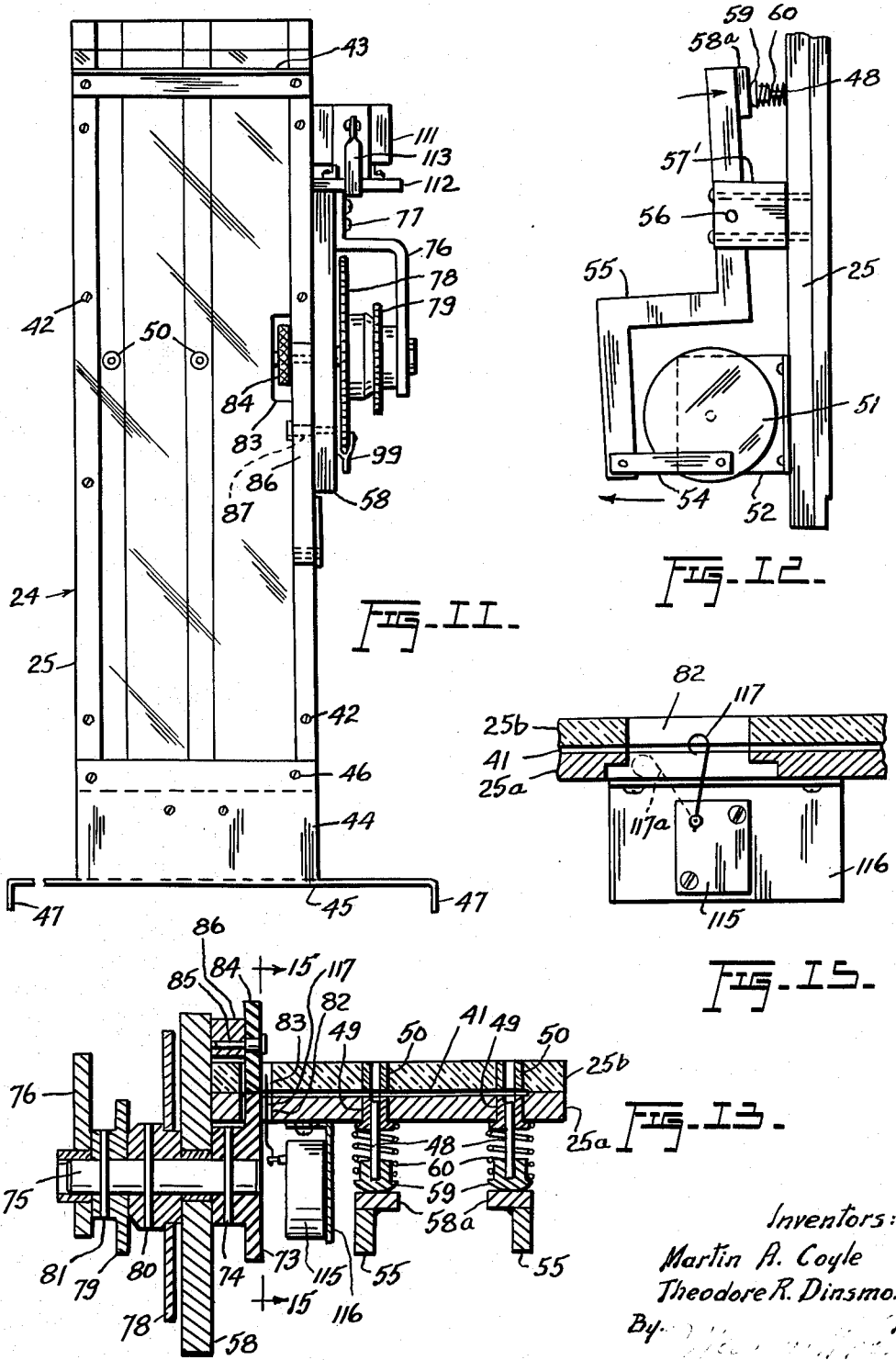

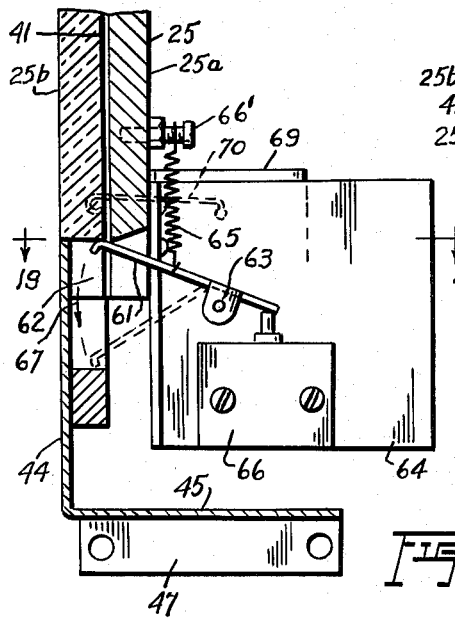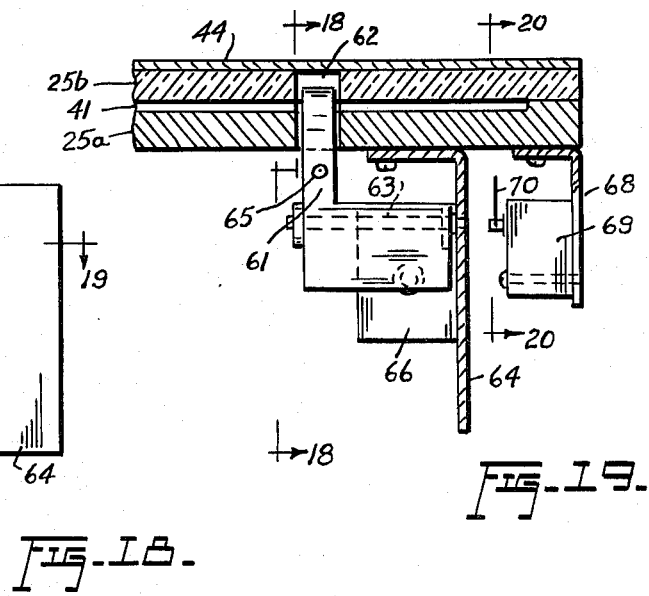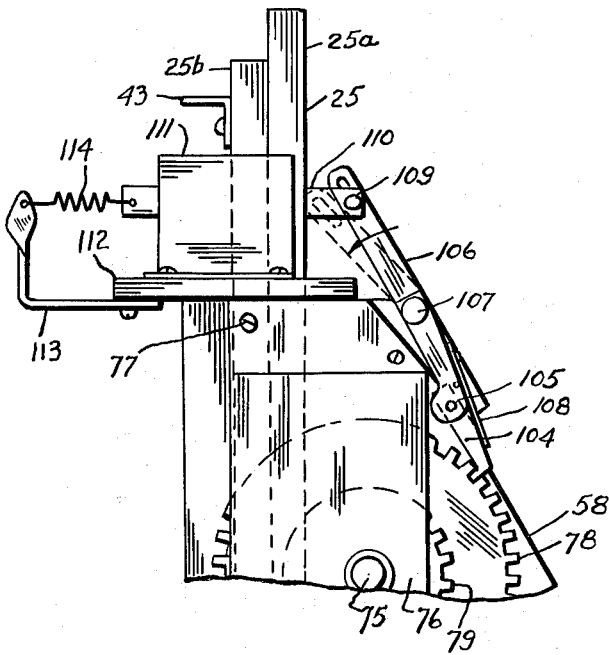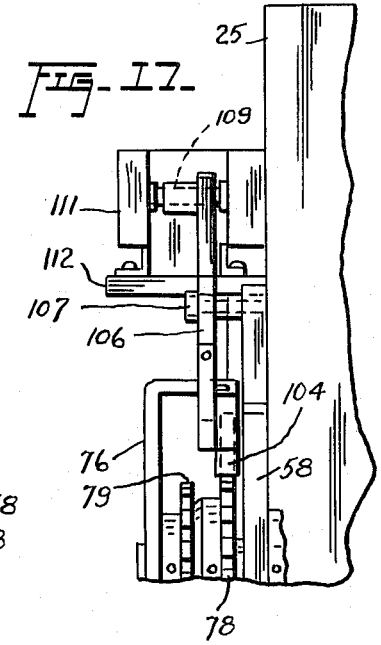

Oct. 26, 1965   M. A. COYLE ETAL   3,214,092
VOTING MACHINES
Filed April 30, 1962   11 Sheets-Sheet 7
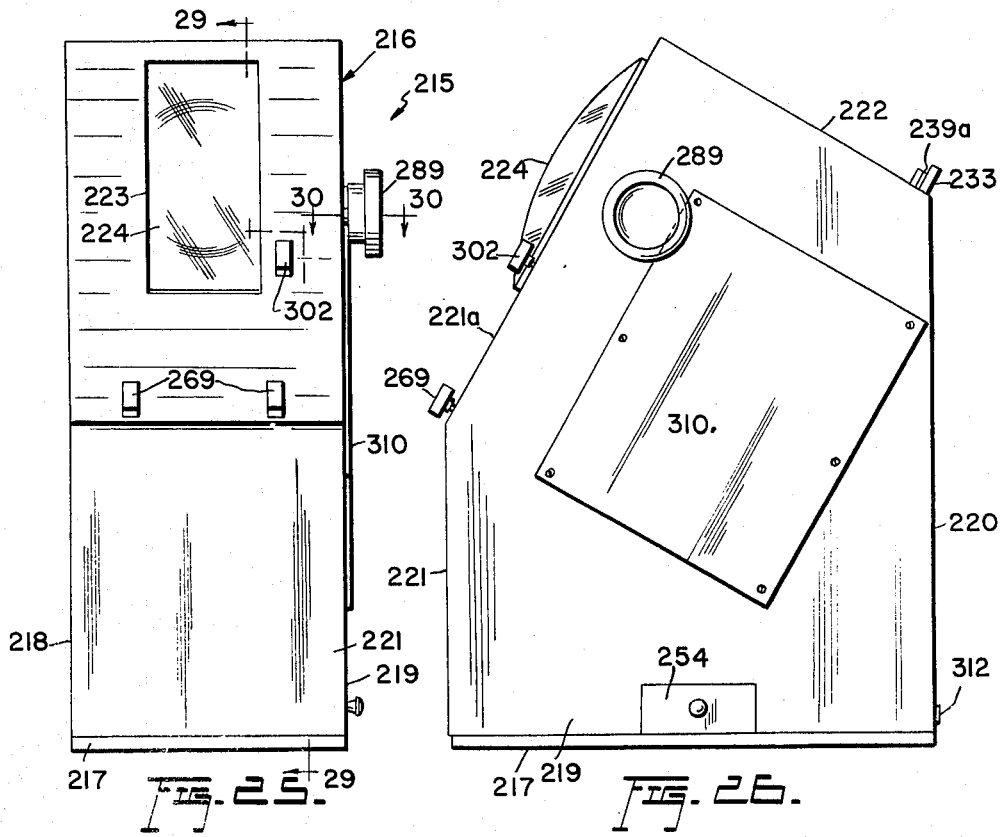
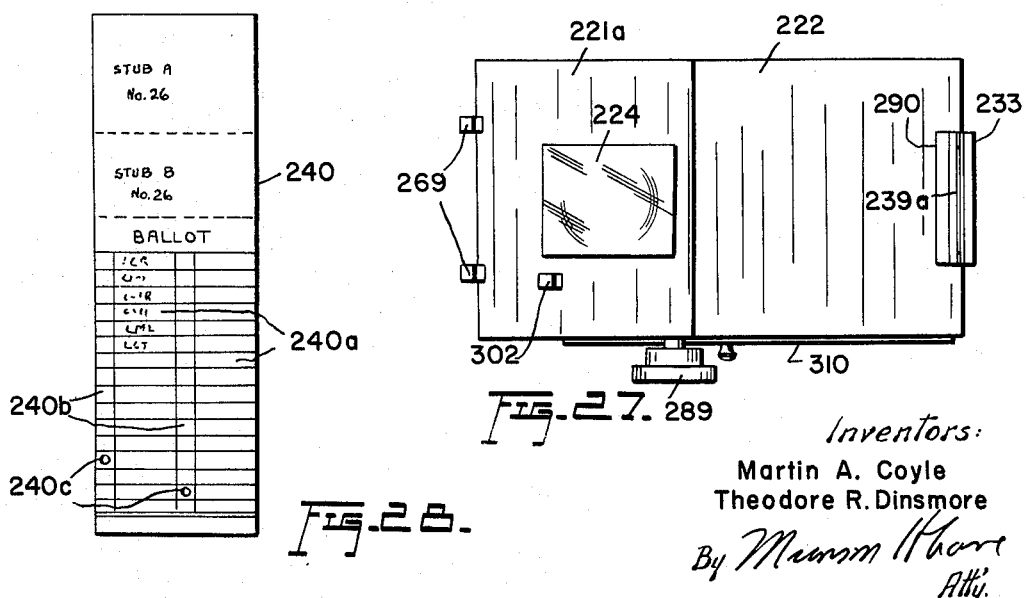
Inventors:
Martin A. Coyle
Theodore R. Dinsmore
By Munsen Hhave
Atty.

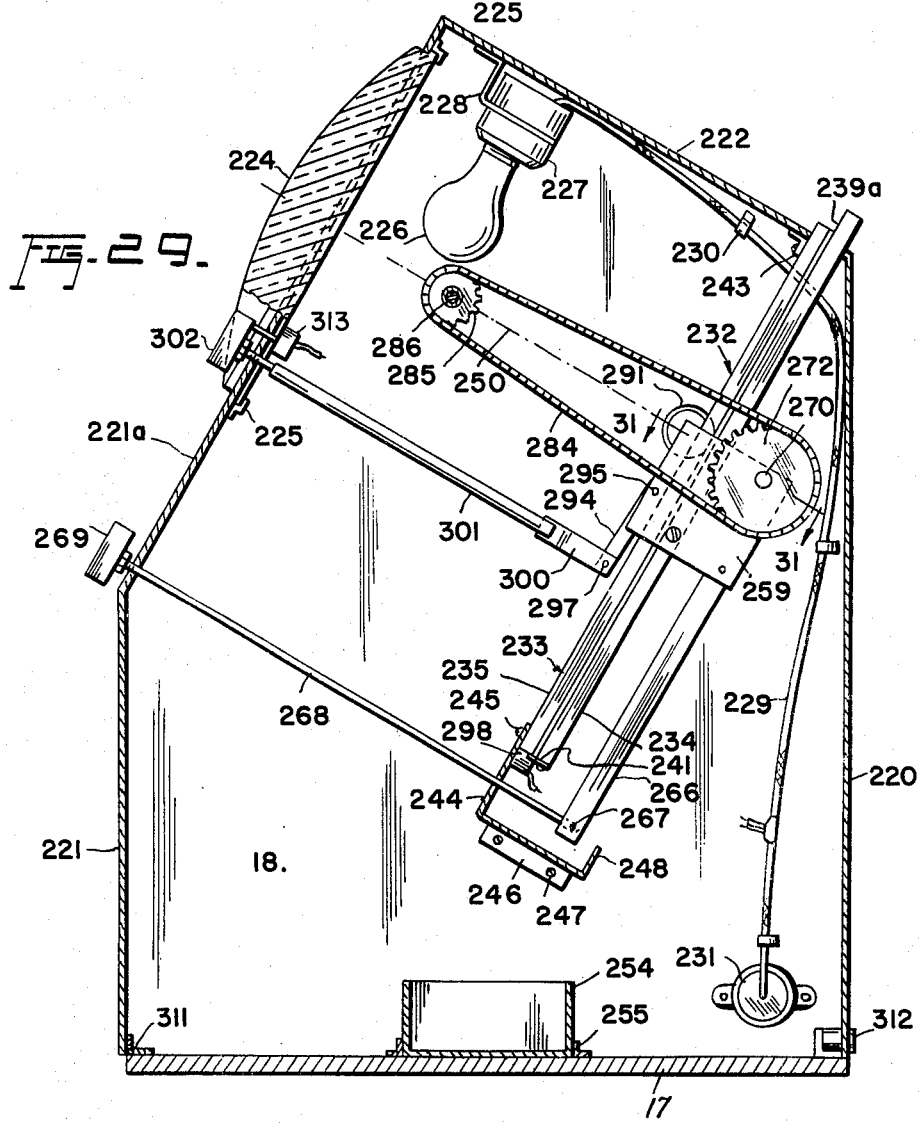
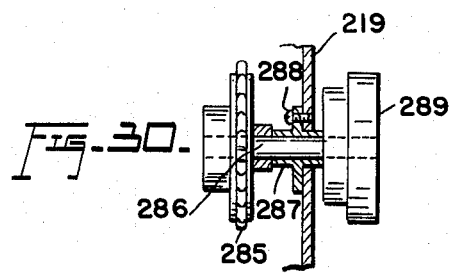

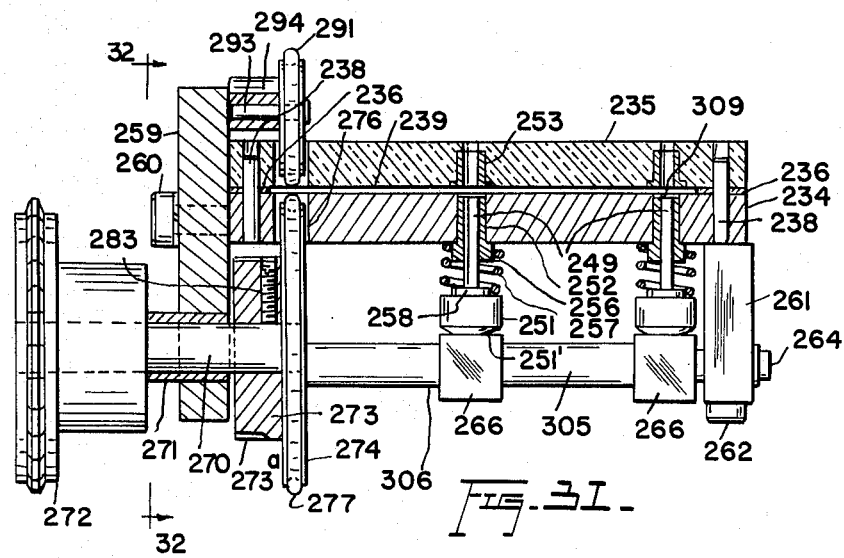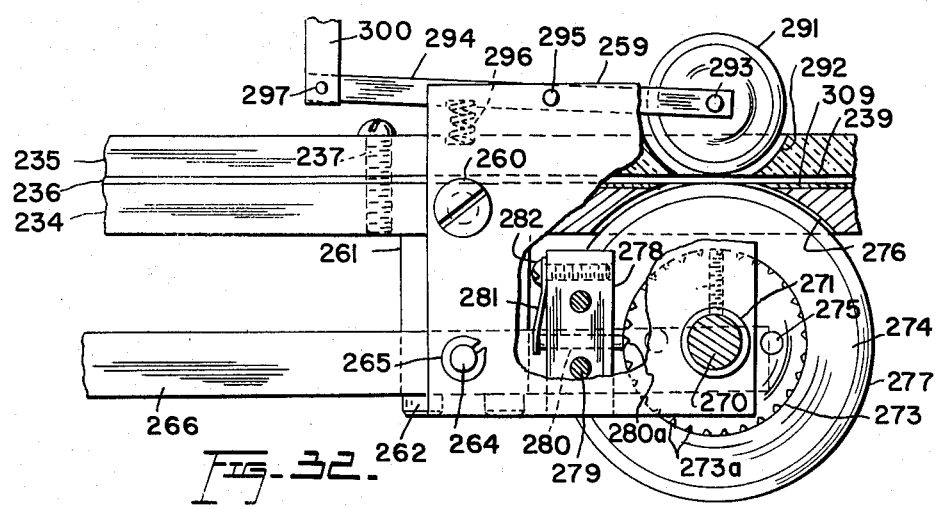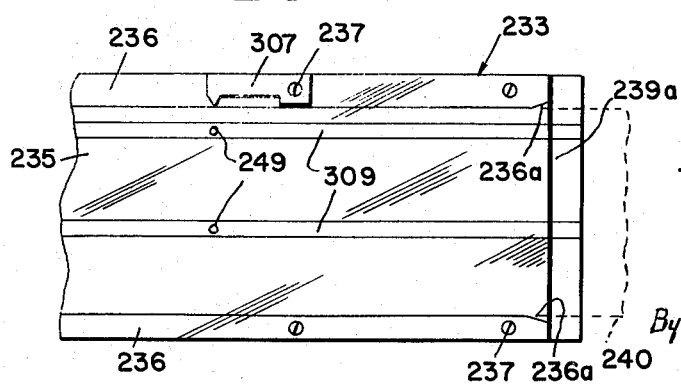

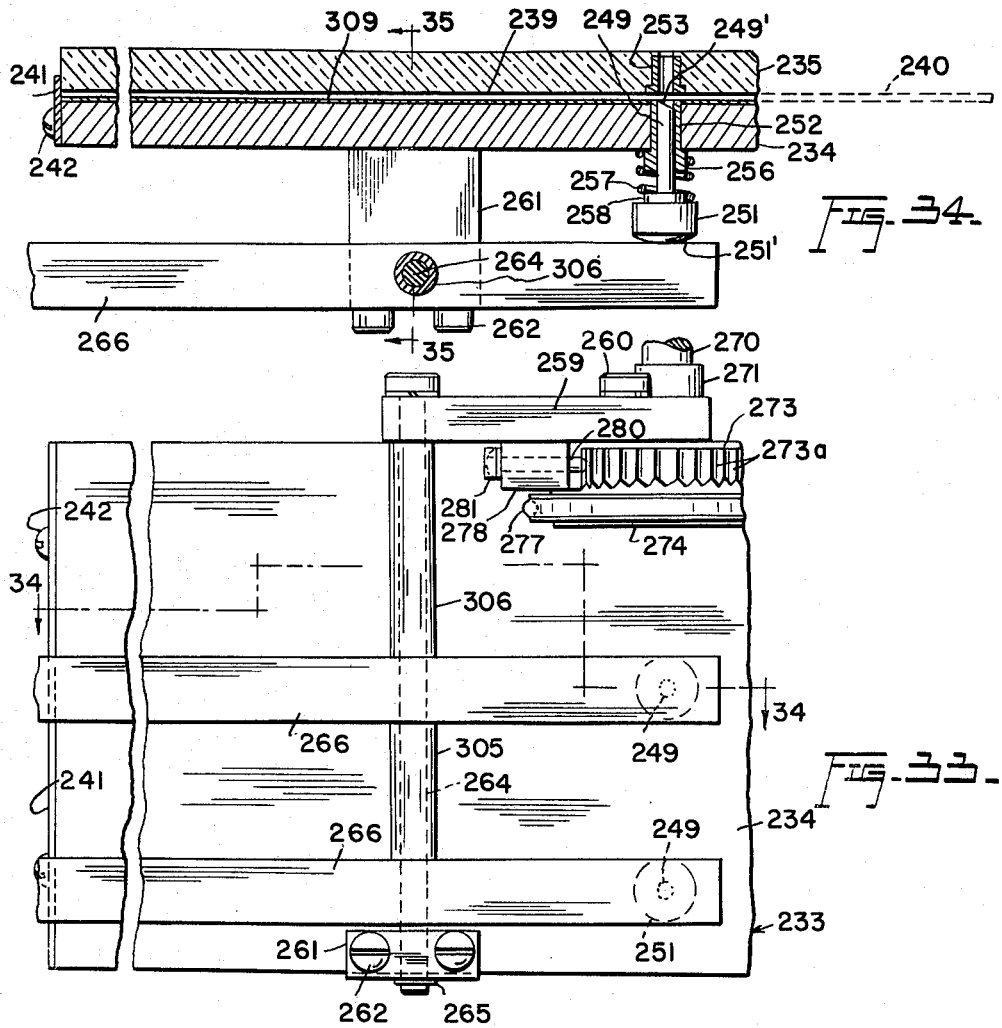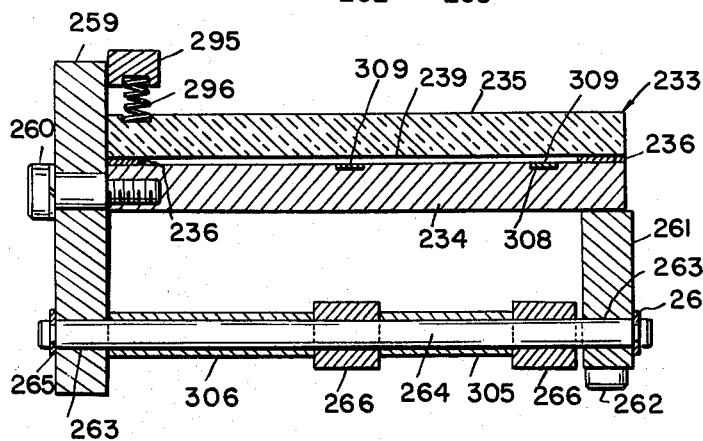

Oct. 26, 1965    M. A. COYLE ETAL    3,214,092
VOTING MACHINES

Filed April 30, 1962    11 Sheets-Sheet 11

INVENTORS
MARTIN A. COYLE
THEODORE R. DINSMORE
BY Munson H. Lane
ATTORNEY

United States Patent Office 3,214,092
Patented Oct. 26, 1965

3,214,092
VOTING MACHINES
Martin A. Coyle, 830 High St., Hamilton, Ohio, and
Theodore R. Dinsmore, Kettering, Ohio; said Dinsmore assignor to said Coyle
Filed Apr. 30, 1962, Ser. No. 193,052
29 Claims. (Cl. 235—51)

The present application is a continuation-in-part of our earlier application Serial No. 635,397 filed January 22, 1957, and Serial No. 797,659 filed March 6, 1959, both now abandoned, and is an improvement on the apparatus disclosed in the application of Marin A. Coyle in Serial No. 105,852 filed April 17, 1961, and employs the general method disclosed in such application.

This invention relates to new and useful improvements in voting machines and in particular the invention concerns itself with a voting machine wherein ballot cards are marked by punching the same at one or more predetermined points in accordance with the choice of the voter.

An object of the invention is to facilitate faster and more efficient elections and to reduce their cost by decreasing the number of persons required for administrative duties incident to voting and vote tabulation; to insure an accurate count of ballots with each individual ballot retaining its identity; and to provide a convenient and easily understandable voting procedure wherein possibilities of potential fraud are virtually eliminated.

Briefly, the machine in accordance with the invention consists of a housing containing a holding and marking mechanism for a ballot card which card is insertable in the housing through an entrance with which the housing is provided, the housing also being equipped with a sight opening having a magnifying lens therein, whereby a voter, after inserting his ballot card in the housing, may conveniently view indicia printed on the card and observe the action taken on the card when he actuates the marking mechanism. Means are provided in the housing for illuminating the ballot card placed in the holding and marking mechanism, so that the indicia on the card are clearly visible to the voter through the magnifying lens while invisible to others.

In terms of the method of voting, the invention involves the steps of supplying a voter with an individual ballot card, formed of relatively stiff material and of a size and shape adapted for use with conventional tabulating machines; placing of the card by the voter in the machine so that the card is always visible to him but not to others, this being facilitated by the use of a suitable magnifying lens, mechanical marking of the card by the voter while the card is in the machine, removal of the marked cards from the machine, and subsequent tabulation of the marked cards of several voters with the aid of a tabulating apparatus. The card is preferably provided with an upper portion which extends above the machine but which may be utilized for indicia such as instructions to the voter. A numbered removable tab may be provided which may be drawn off when the voter has marked his card. Such method is claimed in Coyle application Serial No. 385,740, filed July 24, 1964.

In accordance with such method each voter is supplied with an individual ballot comprising a standard size mechanical tabulating card having indicia thereon, after which the voter inserts the card in a marking machine wherein the card is at all times visible to the voter but is invisible to anyone else. The card is mechanically marked in the machine while fully visible to the voter so that he can determine whether or not any mistakes have been made in the voting, after which the card is removed by the voter from the machine for subsequent tabulation. A plurality of the marked ballots are subsequently tabulated in a standard tabulating machine, and owing to the standard size of the marking any fraudulent ballots will be readily detected by the tabulating machine.

In accordance with the invention a magnifying lens is preferably provided at the front of the housing in a position to permit the voter to view the ballot while in a ballot receiving compartment, and while in that position the voter can view the whole card, which is invisible to others, and can watch the punching operation as it is being mechanically performed by him, and after the punching operation the voter can see that the marking has been accurately done. The use of the magnifying lens in conjunction with standard size tabulating cards or ballots having relatively small indicia thereon makes possible the use of a much smaller voting machine than is now in general operation, thus providing a great saving in expense to the public at large while insuring that the voting machine may be used by any voter owing to the large size of the magnification. When using a standard size IBM card, which is approximately 3¼ inches by 7⅜ inches, after allowing space for headings and descriptive matter required by election rules, there remains sufficient space for 144 printed names using a two-column ballot.

Also, the use of machine made punch or other marks on a ballot card which is subsequently run through a tabulating machine makes it possible to readily detect fraud due to unauthorized punching of the card by means other than the voting machine, since due to the minute tolerance permissible in machine tabulation any fraudulent marking would be readily detected in the tabulating machine and an unauthorized ballot will be automatically discharged by the tabulating machine and will be declared invalid.

With further brief reference to the voting machine, an important feature of the invention resides in provision of signal means, coacting with the aforementioned card illuminating means, for indicating to the voter when his ballot card is properly inserted in the card holding and marking mechanism and the latter is ready to be actuated. Similarly, another important feature resides in the provision of means for automatically rendering the marking mechanism inoperative when the ballot card is not properly positioned. Moreover, another important feature involves the provision of means for positively indexing the ballot card in a plurality of predetermined positions corresponding to the indicia printed on the card, and further means for securely holding the card in a pre-selected position while mechanical punching means are actuated to mark the card. Another important feature resides in the provision of means, comprising an underlying reflective strip, clearly visible through punch marks in the card, for indicating to the voter the particular action which he has taken on the card, without the necessity of removing the card from the machine.

Another object of the invention is to enable a voter to personally mark his or her ballot which at all times is under the voter's complete control, the ballot being adapted for convenient positioning in the machine and perforation thereof by the punching means so that the punch marks are properly located with respect to the voter's choice and any possibility of error in subsequent reading of the vote is eliminated.

Another feature of the invention resides in the provision of an improved ballot holding and marking mechanism including a holder, having a transparent top plate adapted to slidably receive a ballot therein, a ballot punch provided at a fixed location on the holder, and means for slidably indexing a ballot in the holder so that it may be perforated by the punch successively at a plurality of predetermined points.

Another feature of the invention involves the provision of a magnifying lens on the housing of the machine and illuminating means in the housing, whereby the ballot in the holder of the mechanism is clearly visible to facilitate reading of the data thereon.

Another feature of the invention resides in the provision of reflective means in the holder of the mechanism, visible through perforations punched in a ballot, whereby light from the illumating means in the housing is reflected through the perforations to enable the voter to clearly discern at what points the ballot has been punched.

With the foregoing objects and features in view and such other objects and features as may become apparent as this specification proceeds, the invention will be understood from the following description taken in conjunction with the accompanying drawings wherein like characters of reference are used to designate like parts, and wherein:

FIGURE 1 is a front elevational view of a preferred form of voting machine in accordance with the invention;

FIGURE 2 is a side elevational view thereof;

FIGURE 3 is a plan view of a ballot card adapted for use with the machine;

FIGURE 4 is a vertical sectional view of the machine on an enlarged scale;

FIGURE 5 is a horizontal sectional view, taken substantially in the plane of the line 5—5 in FIGURE 2;

FIGURE 6 is a fragmentary sectional detail on an enlarged scale, taken substantially in the plane of the line 6—6 in FIGURE 2;

FIGURE 7 is a fragmentary sectional detail showing the locking means of the back wall or cover of the machine housing;

FIGURE 8 is a fragmentary sectional detail of the locking means, taken substantially in the plane of the line 8—8 in FIGURE 7;

FIGURE 9 is a side elevational view of the ballot card holding and marking or punching mechanism;

FIGURE 10 is an underside plan view of the card holding and marking or punching mechanism shown in FIGURE 9;

FIGURE 11 is a top plan view of the mechanism shown in FIGURES 9 and 10;

FIGURE 12 is a fragmentary side elevational view of the card marking or punching mechanism, taken substantially in the plane of the line 12—12 in FIGURE 10;

FIGURE 13 is a cross-sectional view of the card marking or punching mechanism, taken substantially in the plane of the line 13—13 in FIGURE 10;

FIGURE 14 is a fragmentary sectional detail of the indexing roller and associated mechanism, taken substantially in the plane of the line 14—14 in FIGURE 9;

FIGURE 15 is a fragmentary sectional view of an upper card sensing device, taken substantially in the plane of the line 15—15 in FIGURE 13;

FIGURE 16 is a fragmentary side elevational view, taken substantially in the plane of the line 16—16 in FIGURE 10;

FIGURE 17 is a fragmentary plan view of the card indexing structure shown in FIGURE 16;

FIGURE 18 is a fragmentary sectional view on an enlarged scale of a lower card sensing mechanism, taken substantially in the plane of the line 18—18 in FIGURE 10 and also corresponding to the line 18—18 in FIGURE 19;

FIGURE 19 is a fragmentary sectional view of the lower card sensing device, taken substantially in the plane of the line 19—19 in FIGURE 18;

FIGURE 20 is a fragmentary sectional view of an intermediate card sensing device, taken substantially in the plane of the line 20—20 in FIGURE 19;

FIGURE 21 is a fragmentary perspective view of the ballot card holder;

FIGURE 22 is a fragmentary cross-sectional view of the holder;

FIGURE 23 is a perspective view of a ballot card guide used at the entrance of the housing of the machine;

FIGURE 25 is a front elevational view of a slightly modified form a voting machine in accordance with the invention;

FIGURE 26 is a side elevational view thereof;

FIGURE 27 is a top plan view of the same;

FIGURE 28 is a plan view of one of the ballots similar to FIG. 3;

FIGURE 29 is a vertical sectional view of the machine on an enlarged scale, this view being taken substantially in the plane of the line 29—29 in FIGURE 25;

FIGURE 30 is a fragmentary sectional detail, on an enlarged scale, taken substantially in the plane of the line 30—30 in FIGURE 25;

FIGURE 31 is a cross-sectional view of the ballot holding and marking mechanism on an enlarged scale, taken substantially in the plane of the line 31—31 in FIGURE 29;

FIGURE 32 is a fragmentary sectional view, partially broken away to reveal some of the hidden components and taken substantially in the plane of the line 32—32 in FIGURE 31;

FIGURE 33 is a fragmentary underside plan view of the mechanism shown in FIGURES 31 and 32;

FIGURE 34 is a fragmentary sectional view, taken substantially in the plane of the line 34—34 in FIGURE 33;

FIGURE 35 is a cross-sectional view, taken substantially in the plane of the line 35—35 in FIGURE 34;

FIGURE 36 is a fragmentary top plan view, on a reduced scale, of the ballot holder used in this form of the invention.

Figure 24:
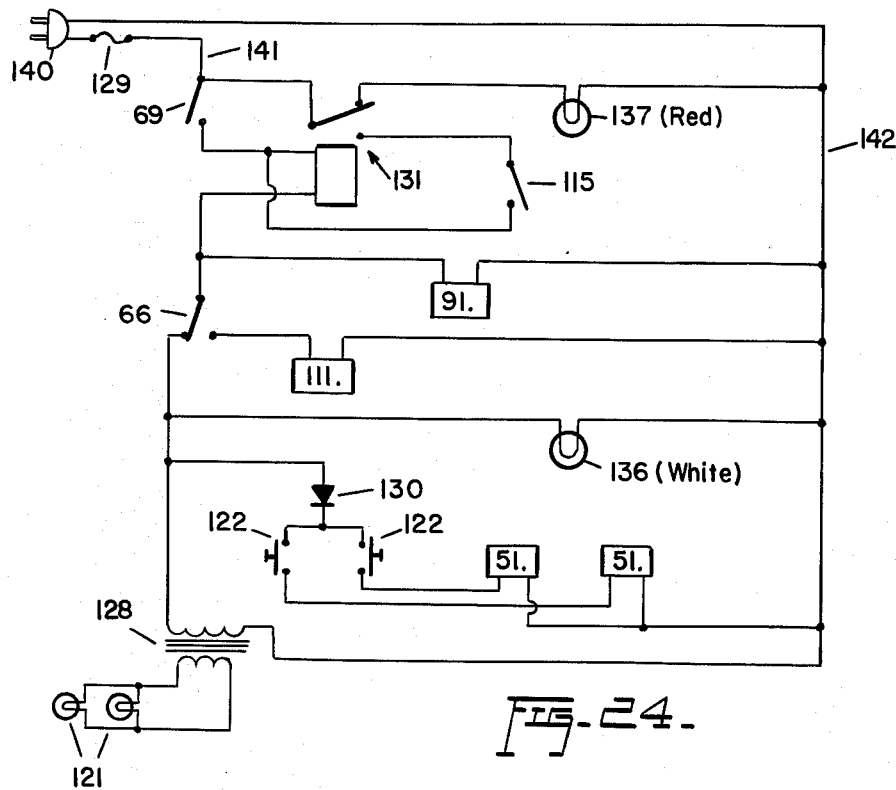
FIGURE 24 is a wiring diagram of the electrical components used in the invention.
Figure 37:
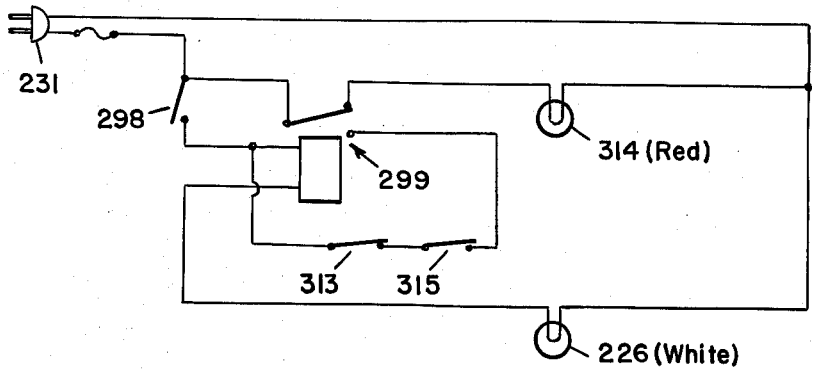
FIGURE 37 is a wiring diagram of the electrical components used in this form of the invention.

The specific embodiment shown in FIGURES 1–24 is that disclosed in our application Serial No. 797,659, while that set forth in FIGURES 25–37 corresponds to the disclosure of Serial No. 635,397. In both embodiments, the general arrangement of parts is similar but whereas in Serial No. 797,659 the marking operation is effected through the use of electromagnets, in Serial No. 635,397 the marking is effected through mechanical connections. However, in describing the two embodiments of the invention, different reference numerals will be employed in describing the two different machines so as to clearly maintain the continuity of the two prior applications.

*Ballot card*

Referring now to FIGS. 1–24 of the accompanying drawings in detail, FIGURE 3 illustrates a ballot card 10 adapted for use with the voting machine according to the invention. The card, although flexible, is sufficiently stiff to resist tearing and bending, and preferably is made of paper or thin cardboard material. The card is elongated and appropriate indicia are printed thereon listing the names of candidates, et cetera. These indicia are arranged in two columns 11, 12, in side by side relation on the card. There are also provided two columns of spaces 13, 14, adjacent the respective columns 11, 12, wherein punch marks may be made in the card at predetermined positions in accordance with the voter's choice of candidates. Spaces form "write-in" candidates may also be provided in either or both columns 11, 12, if so desired, together with spaces for punch marks adjacent thereto. The card is adapted to be inserted in the machine with its lower end 15 first, the card being of sufficient length that its upper end portion is substanially flush with or projects somewhat above the entrance of the machine when the card is fully inserted, and such end portion may be in the form of a removable tab which is drawn off when the voter has marked his card.

Voting machine—General arrangement

The voting machine in accordance with the invention as shown in FIGURES 1, 2, 4 and 5 is designated generally by the reference numeral 16 and embodies in its construction a box-shaped housing 17 including a bottom 17a, a pair of side walls 17b, a vertical lower front wall portion 17c, an upwardly and rearwardly inclined upper front wall portion 17d, a downwardly and rearwardly sloping top wall 17e and a vertical rear wall or cover 17f.

The vertical rear wall or cover 17f is hinged at its upper edge to the housing as indicated at 18, whereby access to the interior of the housing may be had from the rear. As shown in FIGURES 7 and 8, the lower portion of the cover 17f is provided with a suitable cylinder lock 19 equipped with a rotatable latch arm 20, the latter carrying a detent 21 which is engageable with a channel-shaped keeper member 22 secured to the bottom 17a so that the cover may be locked in its closed position. The entire machine rests on a set of button-shaped feet 23 of rubber, or the like, secured to the underside of the bottom 17a.

Ballot card holding and marking mechanism—general arrangement

A ballot card holding and marking mechanism, designated generally by the reference numeral 24, is positioned in the housing 17 and will be described in detail hereinafter. For the time being it will suffice to say that this mechanism includes an elongated card holder 25 which is disposed in an upwardly and rearwardly inclined position in the housing, substantially parallel to the wall portion 17d, and has its upper end projecting upwardly and outwardly through an entrance opening or slot 26 formed in the top wall 17e, as is best shown in FIGURE 4. A card guiding extension 27, shown in FIGURES 2 and 23 is provided and consists of a flat plate 28 equipped at its opposite side edges with a pair of guide rails 29 which are spaced apart by a distance corresponding substantially to the width of the ballot card 10. The extension 27, which may be removed from the machine when the latter is not in use, is adapted to abut the upper end of the holder 25 and the lower end portion of the extension plate 28 is angulated as shown at 28a to underlie the upper end portion of the card holder 25, to which it is removably secured by wing bolts 30 received in open slots 31 formed in the plate portion 28a.

Housing construction

The downwardly and rearwardly inclined top wall 17e is equipped with a suitable carrying handle 32 for the machine as a whole, and the vertical rear cover 17f is formed with a set of ventilating louvers 33 to facilitate circulation of air through the housing and effective cooling of the various electrical components therein contained. For the same purpose, additional louvers 34 are provided at one of the side walls 17b, and louvers 35 are provided in a cover plate 36 on a "manhole" opening (not shown) which exists in the other side wall of the housing. The cover plate 36 is removably secured in position by suitable screws 37.

The upwardly and rearwardly inclined front wall portion 17d is formed with a sight opening wherein is mounted a suitable magnifying lens 38, the latter being held in place by a marginal frame 39 and having a focal length corresponding to its distance from the ballot card holder 25. When the apparatus is not in use, the lens 38 may be protected by a removable cover 40, as shown in FIGURE 2.

Card holding and marking mechanism—Details of construction

Referring now in detail to the ballot card holding and marking mechanism 24, as already stated this includes the card holder 25 which, as is best shown in FIGURES 21 and 22, comprises a pair of elongated, superposed plates, namely, a rear or lower plate 25a and a front or upper plate 25b. The upper plate is formed from suitable transparent material and the lower plate is provided with raised marginal edge portions 25c, so that when the two plates are placed together, a card receiving space or pocket 41 exists therebetween. This space or pocket corresponds in width to the width of the ballot card 10 and slidably receives the same. The two plates are secured together at their longitudinal edge portions by suitable screws 42 (FIG. 11) and dowel pins (not shown).

In order to mount the entire mechanism 25 in the housing 17, an angle bar 43 is secured to the upper end portion of the holder plate 25b and is also secured to the inside of the top wall 17e adjacent the entrance 26. The lower end portion of the plate 25b is recessed as shown in FIGURE 18 to receive a flush-fitting flange 44 of a support bracket 45 which is secured thereto by the screws 46. While the flange 44 is of the same width as the holder 25, the bracket 45 spans the entire width of the housing and is provided with a pair of side flanges 47 which are secured to the housing side walls 17b, as will be clearly understood.

As is best shown in FIGURE 13, the card holder 25 is provided intermediate the ends thereof with card punching means, these being in the form of two transversely spaced punches 48 which are reciprocable in pairs of bushings 49, 50 serving as dies. The bushings are mounted in the holder plates 25a, 25b, respectively, so that the punches 48 traverse the card receiving pocket 41 during their actuation. In this regard it may be noted that the punches are spaced apart by a distance corresponding to the transverse spacing of the colums 13, 14 on the card 10 and are spaced from the sides of the pocket 41 so as to be in register with these columns. Moreover, the distance of the punches downwardly from the upper end of the holder 25 is such that they are aligned with the names of candidates uppermost in the two columns 11, 12 when the card is inserted to the full extent into the machine. As shown in FIGURE 3, the location of the uppermost candidates in the two columns is spaced downwardly from the upper end of the card, so that a substantial upper end portion of the card remains above the location of the punches to extend to the upper end of the card holder. Such upper end portion of the card may be utilized for indica such as instructions to the voter, and the like, and no punch marks are intended to be made thereon by voter.

The two punches 48 are individually actuated by mutually independent means, comprising a pair of solenoids 51 which are secured by suitable angle brackets 52 to the rear or underside of the holder plate 25a, as is best shown in FIGURES 9, 10 and 12. These solenoids are of a conventional type having rotary armature discs 53 and links 54, operatively connected to these discs, transmit their motion to a pair of arms 55 rockably mounted on a transverse shaft 56. The arms 55 are angulated as shown for proper operative connection with the solenoids and the shaft 56 is journalled in a bearing block 57' and a bearing plate 58 secured to opposite side edge portions of the card holder 25. The arms 55 are spaced on the shaft 56 by suitable tubular spacers 57 and the free ends of the arms are provided with pressure pads 58a which engage button-shaped heads 59 on the punches 48. Compression springs 60 are interposed between the heads 59 and the bushings 49, whereby to urge the punches 48 to their retracted position. However, upon energization of either of the solenoids 51, the associated arms 55 will rock on the shaft 56 and depress the associated punch so as to perforate the ballot card in the pocket 41, as will be clearly apparent.

Lower card detecting or sensing means

Means are provided at the lower end of the holder 25 for detecting or sensing the presence of a ballot card in the pocket 41 and for limiting the extent to which the card may be inserted in the pocket, such extent corresponding to the position wherein the names of the candidates uppermost in the two columns 11, 12 on the card are in alignment with the punches 48. As will be hereinafter described, these means are also used to safeguard against possible mutilation of the card by insertion to an excessive depth, in which event such means automatically act to render the card marking punches and card driving means inoperative and to energize sigalling apparatus to indicate to the voter that the card is improperly located.

Card indexing mechanism

Means are provided for mechanically moving the ballot card in the pocket 41 and for positively indexing the same so that the names of the several candidates in the two columns 11, 12 of the card may be selectively brought in alignment with the two punches and the card securely held against movement while the punches perforate spaces in the columns 13, 14 of the card at pre-selected places in accordance with the voter's choice. These means involve the provision of a card driving wheel 73 which, as is best shown in FIGURES 10 and 13, is secured by a pin 74 to a shaft rotatably journalled in the aforementioned bearing plate 58 and in a bearing bracket 76 affixed to the plate 58 by the screws 77. The shaft 75 also has secured thereto a ratchet wheel or gear 78 and a sprocket 79, these being disposed between the bracket 76 and the plate 58 and being secured to the shaft by the pins 80, 81, respectively. The periphery of the wheel 73 projects into a recess 82 formed in the lower holder plate 25a so that it is substantially flush with the underside of the upper plate 25b and capable of operatively engaging a ballot card inserted in the pocket 41 if the latter is urged against the wheel 73. The upper plate 25b is provided in register with the recess 82 with a similar recess 83, whereby to accommodate a pressure roller 84 which is rotatably mounted on a pin 85 carried by a lever 86. The lever 86 is pivoted at 87 to the plate 58, as is best shown in FIGURE 9, and is operatively connected by a link 89 to the rotary armature disc 90 of a solenoid 91, similar to the aforementioned solenoids 51. The solenoid 91 is secured to the holder plate 25a by a suitable bracket 92, it being apparent from the foregoing that when the solenoid 91 is energized, its movement will be transmitted by the link 89 and lever 86 to urge the pressure roller 84 against the periphery of the driving wheel 73, or clamp the ballot card in the pocket 41 between the driving wheel and the pressure roller. Thus, if rotation is imparted to the driving wheel 73, the ballot card may be caused to slide either upwardly or downwardly in the pocket or ejected outwardly through the entrance 26 of the machine. Further the arrangement of the mechanism is such that while the card is being inserted into the pocket, the pressure roller 84 is retracted from the driving wheel 73, so that clearance exists for the card in its initial downward sliding movement. When the card is entered fully to the bottom of the slot, clamping occurs automatically. In regard to subsequent sliding movement of the card under actuation of the driving wheel and pressure roller, the periphery of either or both the wheel and the roller may be knurled, serrated, grooved or rubber-tired, if desired whereby to increase the friction factor between these parts and the card.

Rotation of the driving wheel 73 is effected manually by the voter through the medium of an endless chain 93 (FIG. 4) which passes around the sprocket 79 and around a similar sprocket 94 mounted on a shaft 95 which, as shown in FIGURE 6, is rotatably journalled in a bearing member 96 secured in one of the side walls 17b of the machine housing. The shaft 95 projects to the outside of the housing and carries a hand knob 97, whereby rotation of the shaft 95 and corresponding rotation of the driving wheel 73 may be manually effected.

Ratchet mechanism

The means for indexing the ballot card to a pre-selected position in the pocket 41 are associated with the aforementioned ratchet 78 and comprises an indexing roller 98 rotatably mounted on a lever 99 which is pivoted to the plate 58 as indicated at 100. The lever 99 is preferably composed of two spaced, juxtaposed parts 99a, 99b, having the roller 98 disposed therebetween on a pin 101 as shown in FIGURE 14, and the lever parts 99a, 99b are secured together at one end thereof as indicated at 99c so that they assume the form of an integral unit. The lever portion 99c has connected thereto one end of a tension spring 102, the other end of which is anchored to a pin 103 carried by the plate 58, the spring 102 serving to bias the lever 99 so that the indexing roller 98 is in engagement with the ratchet 78. As will be understood, the spacing of the teeth of the ratchet 78 is such that the engagement of the indexing roller 98 with successive notches between the teeth corresponds to the distance through which it is required to move the ballot card in the pocket 41 from one candidate's name to the next in the colum on the card.

Ratchet pawl

In addition to its purpose as above explained, the ratchet 78 also performs another function, namely, that of preventing under certain circumstances rotation of the driving wheel 73 in a direction which would produce downward sliding movement of the ballot card in the pocket 41. For this purpose, a pawl 104 is provided to engage the ratchet as is best shown in FIGURES 16 and 17, the pawl being pivoted at 105 to a carrying arm 106 which, in turn, is pivoted at 107 to the plate 158. A leaf spring 108 is attached to the arm 106 and bears against the pawl 104 for urging the same in engagement with the ratchet 78. The arm 106, in turn, is operatively attached by a slot and pin connection 109 to a reciprocable armature 110 of a solenoid 111 which is secured to the holder 25 by a suitable bracket 112. The bracket 112 is provided with an extension piece 113 having one end of a tension spring 114 attached thereto, the other end of this spring being connected to the reciprocable armature 110 of the solenoid 111 whereby to urge the same to a position wherein the pawl 104 is normally retracted from the ratchet 78 in the absence of energization of the solenoid. However, when the solenoid is energized, sliding movement of the armature 110 against the action of the spring 114 will cause the pawl to be brought in engagement with the ratchet, preventing rotation of the ratchet and associated driving wheel 73 in a direction which would cause a card in the pocket 41 to travel downwardly. Nevertheless, rotation of the ratchet in a relatively opposite direction, and resultant upward travel of the card in the pocket are possible by "skipping" of the pawl 104 over the ratchet teeth.

Finally, with respect to the mechanism 24, it will be noted that the pocket-forming portion of the holder plate 25a is provided in its surface with a pair of relatively shallow, longitudinally extending channels or grooves having strips of reflective material 118 adhesively or otherwise secured therein, flush with the surface of the plate. These strips are in longitudinal alignment with the punches 48, so that when a ballot card is inserted in the pocket 41 and perforated at a given point by the punch means, upon shifting of the card to a new position the underlying reflective strip will be clearly visible through the perforation, thus assisting the voter in observing the particular point on the card where the punch mark has been made, it being understood, of course, that the transparent upper plate 25b of the holder permits the entire card to be viewed while it is in the pocket.

With further reference to the interior arrangement of the housing, it will be noted that a suitable drawer 126 is slidable in a pair of guides 127 extending between the side walls 17b in the lower portion of the housing, the drawer being disposed below the lower end of the mechanism 24 and thereby adapted to catch punchings from perforations in the ballot cards. Suitable panels or partition walls (not shown) may be provided in the housing at the sides and lower end of the holder 25, so that only the holder and the ballot card therein are visible through the lens 38 while are various mechanical components, such as the ratchet 78, chain 93, et cetera, are hidden from view. Various electrical components such as a transformer 128, a fuse block 129, a rectifier 130, a relay 131, et cetera, employed in the electrical system hereinafter described, may be mounted at suitable locations on the side walls and bottom of the housing, as will be apparent.

A suitable mounting bracket 133 is secured to the underside of the housing wall 17e and supports suitable sockets 134, 135 for a white lamp 136 and a colored, preferably red lamp 137, respectively. The lamp 136, when energized, illuminates the interior of the cabinet so that the holder 25 and the ballot card therein are clearly visible to the voter through the lens 38. The red lamp 137 functions as warning signal means, as will be hereinafter explained.

Means for energizing the solenoids 51 which actuate the punches 48 comprise a pair of push buttons 120 which are mounted on the upper front wall portion 17d of the machine housing at opposite sides of the lens 38. Each button actuates a suitable switch 122 which, as shown in FIGURE 4, includes a stationary contact 122a and a movable contact 122b. The contact 122a is carried by a switch supporting bracket 123 secured to the wall portion 17d and the contact 122b is associated with the depressible button 120, so that when the button is depressed, the switch is closed. A compression spring 124 is interposed between the bracket 123 and the button for biasing the switch to its open position. The buttons 120 preferably contain small electric bulbs 121 and are made of translucent material so that they are visibly illuminated by the bulbs therein when the bulbs are lit. Name plates 125, bearing suitable indicia to identify the buttons 120, are mounted on the wall portion 17d adjacent the buttons, as shown.

Operation

The wiring diagram shown in FIG. 24 is substantially simplified for illustrative purposes and includes a suitable source of current (such as 115 volts A.C.) represented by an appliance plug 140 having a live side 141 and a return side 142.

When the voter approaches the machine to vote, the red light is energized through the normally closed contacts of relay 131. As he inserts his ballot card into the pocket 41, switch arm 177 (see FIGS. 10 and 15) which extends into recess 82 in the holder is engaged and displaced to the position 117a at which point the normally open contacts of switch 115 become closed. These contacts remain closed until the lower end of the ballot card disengages the switch arm 117 while the card is being removed.

At the time of initial insertion of the card into the pocket, the voter pushes the card to the bottom of the slot at which point it engages stop lever 61 (see FIG. 18) in recess 62 in the lower end of holder 25. The lever 61 is pivoted at 63 to bracket 64 secured to plate 25a and is biased upwardly in slot 62 by a spring 65 attached to anchor bolt 66' at the underside of plate 25a. Thus the lever 61 normally contacts the upper end wall of the recess 62 and the spring 65 is sufficiently strong to sustain the lever in that position and provide a stop for the ballot card when the latter is properly inserted into the pocket 41 using normal finger pressure.

As the card approaches the limit of its normal downward travel, as described above, the lower end of the card engages switch arm 70 projecting into a recess 71 in the holder 25 (see FIG. 18) and displaces it thereby closing the normally open contacts of switch 69. With the closing of switch 69, current is supplied to the coil of relay 131 which then closes its own normally open contacts thus establishing an alternate source of power for its own coil independent of switch 69. Relay 131 will now remain energized until its coil current is interrupted by switch 115. When relay 131 becomes energized the normally closed contacts which had been supplying power to the red lamp 137, open and the red light goes off.

Simultaneously with the closure of switch 69 power is supplied to the white lamp 136 which brightly illuminates the interior of the machine, the transformer 128 which illuminates the push button 120 by virtue of the lamps 121 inside the pushbuttons, the rectifier 130 which furnishes power for actuating the punches 48, and the solenoid 91, which causes the pressure roller 84 to clamp the card against the drive wheel 73. The machine is now ready for the voter to select a candidate's name. He does this by rotating the knob 97 which moves the card.

If the voter turns the knob the wrong direction, forcing the card downwardly against the stop lever 61 against the tension of the spring 65 as indicated at 67, the operative engagement of the lever with the switch 66 will cause the normal contact arrangement of switch 66 to change. The normally closed contacts will open thus interrupting power to the white lamp 136, the transformer 128 furnishing power to illuminate the pushbuttons 120, and to the rectifier serving the solenoids 51 thus signalling the voter and paralyzing the punching means. Furthermore, the closing of the normally open contacts of switch 66 energizes the solenoid 111 which locks the card driving means preventing the voter from driving the card further in a downward direction which would mutilate the ballot.

The voting operation is accomplished by depressing either of the buttons 120 to actuate either of the corresponding switches 122 which, in turn, energize the associated solenoid 51 and cause the associated punch 48 to perforate the card at a predetermined point in one of the columns 13 or 14. The voter may slidably index his card in the pocket 41, either upwardly or downwardly, by simply rotating the hand knob 97, whereby to bring various portions of the card in alignment with the punches 48 and facilitate perforation of the card at several preselected points, in accordance with the voter's choice.

During the ballot card marking operation the card is in full view of the voter while, of course, being hidden in the housing from the view of others. As such, the voter may observe the entire card at all times through the magnifying lens 38, the card being properly illuminated by the white lamp 136. Also, as perforations in the card are made by the punches and the card is indexed from one position to another, the reflective strips 118 are visible through the perforations to assist the voter in observing the particular points at which he has punched the card.

When the card marking operation is completed, the voter may withdraw the card from the machine by simply rotating the hand knob 97 in an appropriate direction, so that the card is ejected through the entrance 26. As soon as the lower end of the card approaches the pinch point of pressure roller 84 the switch 115 opens, thus de-energizing relay 131 and automatically de-energizing the lamp 136, the rectifier 130, the transformer 128, and relaxing the pressure roller 84. The red lamp 137 is again energized so that the machine is reset for the next operating cycle.

It is to be particularly noted that during the entire time of ballot handling and marking, the ballot card is solely under control of the voter. The ballot cards are preferably provided with a numbered, removable tab portion which is torn off when the voter has marked his card, and the size and shape of the cards is such that they may be placed in conventional tabulating machines wherein the votes of several voters are counted in an expeditious manner. After tabulating, the ballot cards provide a permanent record of the voting.

Referring now to the embodiment of FIGS. 25–37, the voting machine in accordance with the embodiment is designated generally by the reference numeral 215 and embodies in its construction a suitable substantially upright housing 216 including a bottom 217, a pair of side walls, 218, 219, a back wall 220, a front wall 221 having a rearwardly inclined upper portion 221a, and a top wall 222. The housing may be constructed from sheet metal, with exception of the bottom 217 which is preferably in the form of a relatively thick metal plate, so as to add weight to the machine and prevent any possibility of it shifting or falling over.

The inclined upper portion 221a of the housing front wall is formed with a rectangular, upwardly elongated sight opening 223 in which is mounted a magnifying lens 224 by means of suitable keeper rails 225. Illuminating means are provided within the housing in the form of an electric lamp 226 held in a socket 227 which is supported by a suitable bracket 228 secured to the top wall 222. The lamp 226 is disposed adjacent the side wall 218 at the left hand side of the lens 224 as viewed in FIGURE 25, so that light rays from the lamp do not shine directly into the eyes of the user through the lens. Current to the lamp is delivered by a conductor 229 attached at spaced points to the side wall 218 by suitable clips 230 and connected to an externally accessible connector plug 231 mounted in the wall 218. When the device is in operation, the plug 231 is connected to a source of current by an attachment cord (not shown).

Disposed in rearwardly inclined position within the housing 216 in substantially parallel relation to the front wall portion 221a is a ballot holding and marking mechanism designated generally by reference numeral 232. This mechanism consists primarily of a substantially upright but slightly inclined elongated holder 233 comprising a rear or base plate 234, a transparent front or top plate 235 and a pair of filler strips 236 disposed between the base plate and top plate at the side edges thereof. The base plate, top plate and filler strips are secured together by a set of screws 237 and dowel pins 238, and the space between the two plates afforded by the filler strips provides an elongated pocket 239 which is adapted to slidably receive therein a ballot card 240.

A ballot stop 241 is secured to the lower edge of the rear or base plate 234 by suitable screws 242 so that the pocket 239 is partially closed at its lower end. However, the upper end of the pocket is open to afford an entrance for the ballot as indicated at 239a, and the inner edge portions of the filler strips 236 at this entrance are bevelled as indicated at 236a to facilitate insertion of the ballot, as will be clearly understood. Moreover, the rear plate 234 projects upwardly beyond the upper edge of the front plate 235, so as to provide a shelf, so to speak, on which the lower edge of the ballot may be rested prior to its insertion in the entrance 239a.

The entire mechanism 232 is mounted at the rear of the housing 216 by means of an angle bar 243 secured to the top wall 222 and to the upper end portion of the front plate 235, and by an angle bracket 244 which is secured by suitable screws 245 to the lower end portion of the plate 235. The backet 244 extends transversely of the housing and is provided at the ends thereof with apertured flanges 246 secured to the side walls 218, 219 by the screws 247. It will be observed that the bracket 244 also includes a lower flange 248, the purpose of which will be hereinafter described.

The ballot 240 for use in the machine is printed with two or more colums of indicia such as the names of candidiates, or the like, indicated at 240a, two such columns being shown and spaces 240b are provided on the card adjacent the respective indicia, wherein perforations may be punched as shown at 240c, in accordance with the choice of the voter. The ballot punching operation is performed by two or more independently operable punches 249 in the holder assembly 233, these punches being spaced apart transversely by a distance equal to the transverse spacing of the spaces 240b on the ballot, so that the two punches may perforate, respectively, the two columns of spaces on the ballot card. In the up-and-down direction, the two punches 249 are disposed intermediate the ends of the holder assembly 233 in a plane which is perpendicular to and passes through the axis of the lens 224, as indicated by the dotted line 250 in FIGURE 29. Thus, the portion of the ballot being punched is in direct optical alignment with the lens.

As is best shown in FIGURES 31 and 34, the punches 249 are in the form of rods having obliquely truncated upper ends to provide sharp edges 249' for punching the ballot, and provided at their lower ends with enlarged heads 251. The punches 249 are slidable in suitable bushings 252 provided in the rear plate 234 and, upon passing upwardly through the pocket 239, the punches are received in dies 253 provided in the top plate 235. The dies 253 are in the form of open ended sleeves or bushings, so that the punchings from the ballot are ejected upwardly from the dies and gravitate downwardly along the front plate 235 from which they then drop to the bottom of the housing 216. In this connection it may be noted that a removable drawer 254, slidable between guides 255 on the bottom 217 of the housing is provided to receive such waste punchings in an orderly manner, so that they do not become scattered in the bottom of the housing. The drawer 254 is removable through a suitable opening in the housing side wall 219.

The aforementioned bushings 252 have enlarged heads 256 at the underside of the plate 234, which function as keepers for compression springs 257 interposed between the rear plate 234 and the heads 251 of the punches 249. The heads 251 are also provided with diametrically reduce shoulders 258 functioning as keeper seats for the springs 257, the arrangement being such that the springs 257 serve to urge the punches to their retracted position, that is, out of the dies 253 and pocket 239.

A bearing block 259 is secured by suitable screws 260 to the base plate 234 at one side of the holder 233, while a bearing bracket 261 is similarly secured by the screws 262 to the base plate at the opposite side of the holder. The block 259 and the bracket 261 are provided with aligned apertures 263 to receive a cross-shaft 264 (see FIGURE 35), the end portions of this shaft being formed with annuluar grooves to receive resilient snap rings 265 whereby the shaft is prevented from sliding. A pair of rocker arms 266 are mounted intermediate their ends on the shaft 264, the upper ends of these arms underlying and contacting convex surfaces 251' at the under side of the heads 251 of the respective punches 249, as is best shown in FIGURES 31 and 34. Tubular spacers 305, 306 are provided on the shaft 264 to prevent the rocker arms 266 from sliding or shifting along that shaft.

With reference to FIGURE 29 it will be noted that the lower end of each rocker arm 266 is connected by a pin 267 to a push rod 268, projecting outwardly through the front wall portion 221a of the housing 216 and equipped with a finger knob 269. The knobs 269 of the push rods of the two rocker arms 266 are conveniently disposed at the front of the housing under the lens 224, as shown in FIGURE 25. It will be apparent from the foregoing that when either of the knobs 269 is depressed, the movement of the associated push rod and rocker arm will be transmitted to the respective punch 249 so as to cause the punch to perforate the ballot card in the pocket 239 at a predetermined point. The aforementioned flange 248 on the bracket 244 is engageable by the lower ends of the rocker arms 266 and thus provides stop means for limiting the extent of actuation of the rocker arms and punches by the push rods 268.

In order to facilitate punching of the ballot card anywhere along the two columns of indicia 240a, it is necessary to slide the card upwardly and downwardly in the pocket 239 whereby the various spaces 240b in the two columns may be aligned with the punches 249. Accordingly, means are provided for slidably indexing the ballot card in the pocket, these means comprising, as is best shown in FIGURES 31 and 32, a drive shaft 270, rotatably journalled in a bushing 271 secured in the bearing block 259 and having a sprocket wheel 272 secured to its outer end. An indexing disc 273, provided at its periphery with a set of notches 273a, is secured to the inner end portion of the shaft 270, and a friction drive wheel 274 is in turn secured to the disc 273 by suitable screws 275.

The wheel 274 projects through a recess 276 formed in the plate 234 and has either a barbed rim or a grooved rim in which is mounted a resilient band or tire 277, adapted to frictionally engage the underside of a ballot 240 positioned in the pocket 239. A resiliently tired idler pressure wheel 291 projects through a recess 292 in the plate 235 into the pocket 239, substantially in alignment with the wheel 274. The wheel 291 is mounted by a pin 293 on an arm 294 which, in turn, is pivoted to the block 249 by a pin 295, a compression spring 296 being interposed between the arm 294 and the plate 235 to urge the wheel 291 toward the wheel 274. The ballot in the pocket 239 is receivable between the wheels 274, 291 and accordingly, when the shaft 270 is rotated, the wheel 274 will impart a sliding action to the ballot in the pocket, whereby the indicia in the two columns on the ballot may be brought in alignment with punches 249.

A block 278 is secured by the screws 279 to the inner face of the block 259 and carries a slidable indexing pin 280, having a tapered extremity 280a engageable with the notches 273a in the indexing disc 273. The pin 280 is urged toward the indexing disc by a leaf spring 281, attached to the block 278 by a screw 282, as shown. The disc 273 is secured to the shaft 270 by a set screw 283, and the number of notches on the disc corresponds to the number of spaces 240b in the columns on the ballot 240, so that as the shaft 270 is rotated, the ballot card is advanced in a step-by-step manner from one space 240b to the next, in accordance with the engagement of the pin 280 with the successive notches in the indexing disc 273.

As is best shown in FIGURES 29 and 30, the sprocket 272 on the shaft 270 is driven by endless chain 284 from a smaller sprocket 285 secured to shaft 286. The latter is rotatable in a flanged bushing 287 secured by suitable screws 288 to the housing wall 219. The shaft 286 projects outwardly from the wall 219 and carries a hand knob 289 for turning the same and the shaft 270 through the medium of the chain drive 284. The chain drive 284 is disposed adjacent the side wall 219 at the right hand side of the lens 224 as viewed in FIGURE 25 and, if desired, a suitable partition, or the like, may be provided in the housing inwardly of the chain drive, so that it is not visible through the lens.

When the mechanism 232 is mounted on the housing 216 as described, the upper end portion of the holder 233 projects outwardly through a suitable recess 290 formed in the top wall 222, so that a ballot may be conveniently inserted in or removed from the entrance 239a of the ballot receiving pocket 239 in the holder. Inasmuch as the punches 249 are in direct optical alignment with the axis of the lens 224, it will be understood that the ballot 240 must be inserted in the pocket 239 deeply enough to engage the ballot stop 241 at the bottom of the pocket, in order that the uppermost of the spaces 240b may be in alignment with the punches.

In this connection it is to be noted that the aforementioned arm 294 on which the pressure wheel 291 is mounted (FIGS. 29 and 32) is pivotally connected by a pin 297 to a flat bar 300 which, in turn, has secured thereto a push rod 301 which projects outwardly through the housing wall 221a at one side of the lens 224 and carries a finger knob 302.

Accordingly, when the knob 302 is depressed, the arm 294 raises the idler wheel 291 from the wheel 274 and permits the ballot to slide downwardly by gravity in the pocket 239 to the stop 241. In that position, the spaces 240b at the top of the two columns of indicia on the ballot are in a properly indexed position with the punches 249, and if the voter desired to perforate the ballot at any one of the lower points (below the uppermost of the spaces 240b), the knob 289 is simply rotated so as to slidably index the ballot to any desired level in the pocket. When the ballot marking operation is completed, the ballot is ejected from the pocket 239 through the entrance 239a by simply rotating the knob 289 in the appropriate direction to propel the ballot upwardly.

A stationary pointer 307 is affixed to the front or top plate 235 by one of the aforementioned screws 237 as shown in FIGURE 36, so as to indicate the location of the punches 249 and the particular spaces 240b on the ballot which are in alignment with the punches.

The upper surface of the rear or base plate 234 is preferably provided with longitudinal grooves 308 having strips of reflective material 309 secured therein by adhesive, or the like, these grooves and strips being aligned with the punches 249 as shown in FIGURE 36. Accordingly, when a perforation is formed in the ballot, and the ballot is slidably indexed to a new location in the pocket 239, the strip 309 will be exposed through such a perforation and will reflect the light from the lamp 226 through the lens 224, so that the voter may readily ascertain the particular of the spaces 240b in which the perforation has been made to mark his vote.

Referring again to FIGURES 25–37, it will be noted that the housing side wall 219 is provided with a removable cover plate 310 whereby access to the interior of the housing may be had for purposes of inspection or adjustment of the mechanism therein. Moreover, the bottom 217 of the housing is hinged to the front wall 221 as shown at 311 in FIGURE 29, so that it may be opened for purposes of removing the mechanism 232 from the housing, if desired. The hinged bottom is retained in its closed position by a suitable lock 312.

In order to assure that the ballot is secured and remains in a proper position while it is being punched, means are provided to eliminate any possibility of the voter failing to insert the ballot to the bottom of the pocket 239, or accidentally touching the knob 302 to release pressure on the ballot by the idler wheel 291.

These means comprise a micro-switch 298 which is suitbly mounted at the bottom of the pocket 239 and is in circuit with a solenoid coil of a relay 299 which energizes the lamp 226 when the ballot is pushed against the stop 241 and the switch 298, said lamp remaining energized thereafter regardless of ballot position unless the ballot is removed from between the drive wheels or unless the knob 302 is depressed, as explained further hereinafter.

A second micro-switch 313 may be mounted in the housing 216 for engagement with the knob 302, this switch also being in circuit with the relay 299 and permitting flow of current to the lamp 226 only when the knob 302 is released and the idler wheel 291 is engaging the ballot card. When the knob 302 is depressed to release the wheel 291 from the ballot card, current to the relay and therefore to the lamp 226 is automatically interrupted and is permitted to flow to a red colored lamp 314, thus indicating to the voter that the ballot is not secured against possible shifting movement in the pocket 239.

Similarly a third micro-switch 315 may be mounted on the mechanism assembly 232 to sense the presence of a ballot card when the latter is properly gripped between the drive wheels and to interrupt the flow of current to the relay 299 when such a condition does not exist, thereby switching current from the white to the red lamp and signalling the voter accordingly.

It is believed that the advantages and use of the invention will be clearly apparent from the foregoing. However, although preferred embodiments of the invention have been illustrated and described herein, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. In a voting machine comprising a housing having a ballot receiving and marking compartment at the rear thereof and having an openable wall portion permitting access to said compartment, a sight opening at the front of the housing permitting full view of the ballot receiving and marking compartment and of a card carried thereby, the combination of a vertically disposed holder removably mounted in said ballot receiving and marking compartment provided with an elongated pocket adapted to slidably receive a ballot card therein, ballot card marking means provided on said holder, means for slidably indexing a ballot card in said pocket whereby the same ballot card may be marked by said marking means at a plurality of predetermined points, and means for rendering said marking means inoperative when the ballot card is not properly positioned in said pocket, said sight opening being provided with a magnifying lens whereby a ballot card mounted in said pocket is clearly visible to a voter operating the machine but is invisible to others.

2. In a voting machine comprising a housing having a ballot receiving and marking compartment at the rear thereof and having an openable wall portion permitting access to said compartment, a sight opening at the front of the housing permitting full view of the ballot receiving and marking compartment and of a card carried thereby, the combination of a vertically disposed card holder removably mounted in said ballot receiving and marking compartment provided with a pocket adapted to receive a ballot card therein, ballot card marking means provided on said holder, normally energized warning signal means mounted within said housing between said side opening and said card holder, other means for illuminating a ballot card in said pocket, and means responsive to the presence of a ballot card in the pocket for automatically energizing said illuminating means and simultaneously cutting off said warning signal means, said sight opening provided with a magnifying lens whereby a ballot card mounted in said pocket is clearly visible to a voter operating the machine but is invisible to others.

3. In a voting machine comprising a housing having a ballot receiving and marking compartment at the rear thereof and having an openable wall portion permitting access to said compartment, a sight opening at the front of the housing permitting full view of the ballot receiving and marking compartment and of a card carried thereby, the combination of a vertically disposed holder removably mounted in said ballot receiving and marking compartment provided with a pocket adapted to receive a ballot card therein, ballot card marking means provided on said holder, means for illuminating a ballot card in said pocket, means responsive to the presence of a ballot card in the pocket for automatically energizing said illuminating means, and means responsive to improper positioning of the ballot card in the pocket for automatically rendering said marking means and said illuminating means inoperative, said sight opening being provided with a magnifying lens whereby a ballot card mounted in said pocket is clearly visible to a voter operating the machine but is invisible to others.

4. In a voting machine comprising a housing having a ballot receiving and marking compartment at the rear thereof and having an openable wall portion permitting access to said compartment, a sight opening at the front of the housing permitting full view of the ballot receiving and marking compartment and of a card carried thereby, the combination of a vertically disposed holder removably mounted in said ballot receiving and marking compartment provided with an elongated pocket adapted to receive a ballot card therein, ballot card marking means provided on said holder, means for slidably indexing a ballot card in said pocket whereby the same ballot card may be marked by said marking means at a plurality of predetermined points, said indexing means including a movable card propelling member and a movable coacting element adapted for urging the ballot card in driving engagement with said member, and means responsive to the presence of a ballot card in said pocket for moving said coacting element to its operative position, said sight opening being provided with a magnifying lens whereby a ballot card mounted in said pocket is clearly visible to a voter operating the machine but is invisible to others.

5. In a voting machine comprising a housing having a ballot receiving and marking compartment at the rear thereof and having an openable wall portion permitting access to said compartment, a sight opening at the front of the housing permitting full view of the ballot receiving and marking compartment and of a card carried thereby, the combination of a vertically disposed holder removably mounted in said ballot receiving and marking compartment provided with an elongated pocket adapted to receive a ballot card therein, stop means provided at one end of said pocket and engageable by the card when the latter is fully inserted in the pocket, card marking means provided on said holder, means for slidably indexing a card in said pocket whereby the same ballot card may be marked by said marking means at a plurality of predetermined points, said stop means being movable beyond a predetermined stopping position by sliding of the card by said indexing means past said stopping position, and means responsive to movement of said stop means for automatically rendering said marking means inoperative, said sight opening being provided with a magnifying lens whereby a ballot card mounted in said pocket is clearly visible to a voter operating the machine but is invisible to others.

6. The device as defined in claim 5 together with means for locking said indexing means against further sliding of the card in a direction past said predetermined stopping position, and means responsive to said movement of said stop means for energizing said locking means.

7. The device as defined in claim 5 together with means for illuminating a ballot in said pocket, and means responsive to said movement of said stop means for rendering said illuminating means inoperative.

8. In a voting machine, the combination of a housing having a ballot receiving and marking compartment at the rear thereof, a sight opening at the front of the housing permitting full view of the ballot receiving and marking compartment, a holder mounted in said compartment and provided with an elongated pocket adapted to receive a ballot card therein, said housing having a ballot card entrance at one end of said pocket, card stop means provided on said holder at the other end of the pocket, said housing also having a sight opening whereby a card in said pocket is visible to the voter, card marking means provided on the holder, means for slidably indexing the ballot card in said pocket whereby the same card may be marked by said marking means at a plurality of predetermined points, means provided at the outside of said housing for actuating said marking means and said indexing means, card illuminating means provided in said housing, means responsive to the presence of a card in said pocket for energizing said illuminating means, and means responsive to abnormal engagement of said stop means by a card improperly located in said pocket for automatically rendering said marking means and said illuminating means inoperative, said sight opening being provided with a magnifying lens whereby a ballot card mounted in said pocket is clearly visible to a voter operating the machine but is invisible to others.

9. In a voting machine comprising a housing having a ballot receiving and marking compartment at the rear thereof and having an openable wall portion permitting access to said compartment, a sight opening at the front of the housing permitting full view of the ballot receiving and marking compartment and of a card carried thereby, the combination of a plate-shaped holder removably mounted in said ballot receiving and marking compartment provided with an elongated pocket adapted to slidably receive a ballot card therein, said pocket having an entrance at one end thereof, movable card stop means provided at the other end of said pocket, resilient means biasing said stop means to a normal position, card marking means provided intermediate the ends of said holder, means for slidably indexing a card in said pocket whereby the same card may be marked by said marking means at a plurality of predetermined points, electro-magnetic means for actuating said marking means, means responsive to the presence of a card in said pocket for rendering said electro-magnetic means operative, and means responsive to movement of said stop means to an abnormal position against the action of said biasing means for automatically de-energizing said electro-magnetic means, said sight opening being provided with a magnifying lens whereby a ballot card mounted in said pocket is clearly visible to a voter operating the machine but is invisible to others.

10. The device as defined in claim 9 together with means for locking said indexing means against sliding of the card past the abnormal position of said stop means, and means responsive to movement of the stop means to the abnormal position for energizing said locking means.

11. The device as defined in claim 9 wherein said indexing means include a manually movable propelling member and a movable coacting element adapted for urging the ballot card in driving engagement with said propelling member, and means responsive to the presence of a card in said pocket for moving said coacting element to its operative position.

12. In a voting machine, the combination of a housing having a ballot receiving and marking compartment at the rear thereof, a sight opening at the front of the housing permitting full view of the ballot receiving and marking compartment, a holder mounted in said compartment and provided with a pocket adapted to receive a ballot card therein, a reciprocable punch provided on said holder and adapted to traverse said pocket whereby to perforate a card in the latter, electro-magnetic means provided on said holder and operatively connected to said punch, a momentary contact switch provided at the outside of said housing in circuit with said electro-magnetic means, and switch means on said holder responsive to the presence of a card in said pocket for automatically energizing the circuit of the electro-magnetic means and said momentary contact switch, said sight opening being provided with a magnifying lens whereby a ballot card mounted in said pocket is clearly visible to a voter operating the machine but is invisible to others.

13. The device as defined in claim 12 wherein said holder is provided with a recess communicating with said pocket, said switch means including a card engaging element projecting into said recess.

14. The device as defined in claim 12 wherein the ballot card is adapted to be slidably indexed in said pocket for perforation by said punch at a plurality of predetermined points, and card indexing means comprising a manually movable card propelling member carried by said holder, a movable coacting element provided on the holder and adapted to urge a card in driving engagement with said propelling member, and electro-magnetic means for moving said element to its operative position, said switch means being operative for automatically energizing said last mentioned electro-magnetic means.

15. The device as defined in claim 12 wherein the ballot card is adapted to be slidably indexed in said pocket for perforation by said punch at a plurality of predetermined points, and card indexing means comprising a driving wheel rotatably mounted on said holder and having its periphery disposed in a recess communicating with said pocket whereby to engage one side of a card in the latter, a pivoted arm provided on the holder, a pressure roller carried by said arm and having its periphery disposed in said recess whereby to engage the opposite side of the card in the pocket, and electro-magnetic means provided on the holder and operatively connected to said arm for urging said roller to its operative position, said mentioned electro-magnetic means being in circuit with said switch means.

16. The device as defined in claim 15 together with a manually rotatable actuating element provided at the outside of said housing, and means operatively connecting said element to said driving wheel for rotating the same.

17. In a voting machine, the combination of a housing provided with a sight opening, a holding mechanism for a ballot card disposed within said sight opening, said mechanism comprising an upright elongated holder having upper and lower ends and provided therein with an elongated pocket adapted to slidably receive a ballot card, said pocket extending longiudinally of the holder and having a closed lower end and an entrance at the upper end of the holder, the closed lower end of the pocket abutting an end edge of said card when the card is fully inserted in the pocket whereby to provide stop means for limiting the extent of insertion of the card in the pocket, ballot card marking means provided at a fixed location on said holder in upwardly spaced relation from the lower end of said pocket and in optical alignment with said sight opening, means for step-by-step slidably indexing said card upwardly from its fully inserted position in the pocket whereby the card may be marked by said marking means at a plurality of selected points spaced longitudinally of the card and subsequently ejected from the pocket upwardly through said entrance and means for releasing said indexing means from its operative engagement with the card whereby a card inserted in said entrance may slide freely downwardly in said pocket into abutment with said stop means.

18. In a voting machine, the combination of a housing provided with a sight opening, an elongated ballot card having a plurality of longitudinally spaced areas thereon for ballot markings, a holding mechanism for said card disposed within said housing, said mechanism comprising an upright elongated holder having upper and lower ends and provided therein with an elongated pocket slidably receiving said card, said pocket extending longitudinally of the holder and having a closed lower end and an entrance at the upper end of the holder, the closed lower end of the pocket abutting an end edge of said card when the card is fully inserted in the pocket whereby to provide stop means for limiting the extent of insertion of said card in the pocket, ballot card marking means provided at a fixed location on said holder in upwardly spaced relation from the lower end of said pocket and in optical alignment with said sight opening, means for step-by-step slidably indexing said card upwardly from its fully inserted position in the pocket whereby said card may be marked by said marking means at a plurality of selected longitudinally spaced areas and subsequently ejected from the pocket upwardly through said entrance, and means for releasing said indexing means from its operative engagement with said card whereby the card when inserted in said entrance may slide freely downwardly in said pocket into abutment with said stop means.

19. In a voting machine, a holding mechanism for a ballot card, said mechanism comprising an elongated holder having upper and lower ends and provided therein with an elongated pocket adapted to slidably receive a ballot card, said pocket extending longitudinally of the holder and having a closed lower end and an entrance at the upper end of the holder whereby a ballot card may be slidably inserted in said pocket through said entrance and permitted to slide downwardly by gravity against the closed lower end of the pocket, ballot card marking means provided at a fixed point on said holder in upwardly spaced relation from the lower end of said pocket, means for step-by-step slidably indexing the card upwardly in the pocket whereby the card may be marked by said marking means at a plurality of selected longitudinally spaced points and subsequently ejected from the pocket through said entrance, means for releasing said indexing means from its operative engagement with the card whereby a card inserted in said entrance may slide downwardly in the pocket by gravity, and means responsive to the presence of a card in the pocket for rendering said releasing means inoperative to facilitate actuation of said indexing means.

20. In a voting machine, the combination of a housing provided with a sight opening, a holding mechanism for a ballot card disposed within said housing, said mechanism comprising an upright elongated holder provided therein with an elongated pocket adapted to slidably receive a ballot card, said pocket having a closed lower end and an entrance at the relatively upper end of the holder whereby a ballot card may be slidably inserted in said pocket through said entrance and permitted to slide downwardly by gravity against the closed end of the pocket, ballot card marking means provided at a fixed location on said holder in longitudinally spaced relation from the closed end of said pocket and in optical alignment with said sight opening, and means for step-by-step slidably indexing the ballot card longitudinally on the pocket whereby the same ballot card may be marked by said marking means at a plurality of selected points spaced longitudinally of the card, said ballot marking means comprising electro-magnetically actuated punching mechanism.

21. In a voting machine, the combination of a housing provided with a sight opening, a holding mechanism for a ballot card disposed within said housing, said mechanism comprising an upright elongated holder provided therein with an elongated pocket adapted to slidably receive a ballot card, said pocket having a closed lower end and an entrance at the relatively upper end of the holder whereby a ballot card may be slidably inserted in said pocket through said entrance and permitted to slide downwardly by gravity against the closed end of the pocket, ballot card marking means provided at a fixed location on said holder in longitudinally spaced relation from the closed end of said pocket and in optical alignment with said sight opening, and means for step-by-step slidably indexing the ballot card longitudinally on the pocket whereby the same ballot card may be marked by said marking means at a plurality of selected points spaced longitudinally of the card, said ballot marking means including manually controlled electro-magnetically actuated punching mechanism.

22. In a voting machine, the combination of a housing provided with a sight opening, a holding mechanism for a ballot card disposed within said housing, said mechanism comprising an upright elongated holder provided therein with an elongated pocket adapted to slidably receive a ballot card, said pocket having a closed lower end and an entrance at the relatively upper end of the holder whereby a ballot card may be slidably inserted in said pocket through said entrance and permitted to slide downwardly by gravity against the closed end of the pocket, ballot card marking means provided at a fixed location on said holder in longitudinally spaced relation from the closed end of said pocket and in optical alignment with said sight opening, and means for step-by-step slidably indexing the ballot card longitudinally on the pocket whereby the same ballot card may be marked by said marking means at a plurality of selected points spaced longitudinally of the card, said ballot marking means including one or more punches, and removable means provided in the bottom of the housing for receiving waste punchings.

23. In a voting machine, the combination of a housing provided with a sight opening, a holding mechanism for a ballot card disposed within said housing, said mechanism comprising an upright elongated holder provided therein with an elongated pocket adapted to slidably receive a ballot card, said pocket having a closed lower end and an entrance at the relatively upper end of the holder whereby a ballot card may be slidably inserted in said pocket through said entrance and permitted to slide downwardly by gravity against the closed end of the pocket, ballot card marking means provided at a fixed location on said holder in longitudinally spaced relation from the closed end of said pocket and in optical alignment with said sight opening, and means for step-by-step slidably indexing the ballot card longitudinally on the pocket whereby the same ballot card may be marked by said marking means at a plurality of selected points spaced longitudinally of the card, said ballot marking means including one or more punches, illuminating means in said housing between the sight opening and the card marking means, and reflecting means carried by said holder at the rear of the pocket and visible through perforations in the punched card to show that the card has been punched.

24. A voting machine as set forth in claim 20, wherein the ballot card includes at least two laterally spaced columns of longitudinally arranged indicia with marking spaces corresponding to each item in each column, said ballot marking means including at least two independently operable markers, one for each column.

25. A ballot holding and marking mechanism for voting machines, comprising an elongated holder having upper and lower ends and including a base plate and a transparent top plate secured in spaced superposed relation to said base plate whereby to provide a pocket therebetween to slidably receive a ballot, a die provided in said top plate, a punch reciprocable in said base plate coaxially with said die, said punch traversing said pocket and being receivable in said die whereby to perforate a ballot in the pocket, a bearing block secured to one side of said holder, a bearing bracket secured to the other side of the holder, a cross shaft mounted in said bearing block and bracket under the holder, a rocker arm mounted intermediate the ends thereof on said cross shaft and having one end thereof in operative engagement with said punch, actuating means connected to the other end of said rocker arm for projecting said punch into said die, resilient means for retracting the punch, a drive shaft rotatable in said bearing block under said holder, a ballot engaging friction drive wheel rotatable with said drive shaft and having a peripheral portion thereof projecting into said pocket through a recess formed in said base plate, indexing means for said drive shaft, and means for rotating the drive shaft whereby the same ballot in said pocket may be slid by said friction drive wheel for perforation by said punch successively at a plurality of predetermined points spaced longitudinally of the sliding movement of the ballot in the pocket.

26. The device as defined in claim 25 together with an idler wheel projectable and retractable through a recess formed in said top plate at a point adjacent said friction drive wheel, said idler wheel being frictionally engageable with a ballot in said pocket.

27. The device as defined in claim 25 together with an idler wheel projectable and retractable through a recess formed in said top plate at a point adjacent said friction drive wheel, said idler wheel being frictionally engageable with a ballot in said pocket, resilient means for urging said idler wheel to its projected position, and means for retracting said idler wheel against the action of said resilient means.

28. A ballot holding and marking mechanism for voting machines, comprising an elongated holder having upper and lower ends and including a base plate and a transparent top plate secured in spaced superposed relation to said base plate whereby to provide a pocket therebetween to slidably receive a ballot, a die provided in said top plate, a punch reciprocable in said base plate coaxially with said die, said punch traversing said pocket and being receivable in said die whereby to perforate a ballot in the pocket, a bearing block secured to one side of said holder, a bearing bracket secured to the other side of the holder, a cross shaft mounted in said bearing block and bracket under the holder, a rocker arm mounted intermediate the ends thereof on said cross shaft and having one end thereof in operative engagement with said punch, actuating means connected to the other end of said rocker arm for projecting said punch into said die, resilient means for retracting the punch, a drive shaft rotatable in said bearing block under said holder, a ballot engaging friction drive wheel rotatable with said drive shaft and having a peripheral portion thereof projecting into said pocket through a recess formed in said base plate, indexing means for said drive shaft, means for rotating the drive shaft whereby a ballot in said pocket may be slid by said friction drive wheel for perforation by said punch successively at a plurality of predetermined points, and an indicator strip provided on the upper surface of said base plate and adapted to be visible through perforations in a ballot in said pocket, thereby permitting the voter to see such action as he may take upon the ballot.

29. In a voting machine, the combination of a housing provided with a sight opening, a ballot holder disposed in said housing in optical alignment with said sight opening, ballot marking means provided at a fixed location on said holder, means on the holder for slidably indexing a ballot card therein whereby the ballot may be marked by said marking means successively at a plurality of predetermined points, means at the exterior of said housing for actuating said marking and said ballot indexing means, first and second indicator lamps provided in said housing, and a switch responsive to actuation of said ballot indexing means, said switch being in circuit with said lamps whereby the first lamp may be energized and the second lamp de-energized by actuation of the ballot indexing means and whereby the first lamp may be de-energized and the second lamp energized by non-actuation of the ballot.

References Cited by the Examiner

UNITED STATES PATENTS 2,131,601  9/38  Taub _____ 83—520
2,691,831  10/54  Jordon _____ 35—84
2,694,339  11/54  Baireuther et al. _____ 88—1

LEO SMILOW, *Primary Examiner*.